(12) United States Patent
Jung (10) Patent No.: US 9,729,034 B2
(45) Date of Patent: Aug. 8, 2017

(54) ROTOR WITH 2-STEP SHAPED SLOT AND INDUCTION MOTOR HAVING THE SAME

(71) Applicant: HYUNDAI MOBIS CO., LTD., Seoul (KR)

(72) Inventor: Daesung Jung, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 318 days.

(21) Appl. No.: 14/508,826

(22) Filed: Oct. 7, 2014

(65) Prior Publication Data

US 2015/0102697 A1 Apr. 16, 2015

(30) Foreign Application Priority Data

Oct. 15, 2013 (KR) .................. 10-2013-0122692

(51) Int. Cl.
*H02K 17/16* (2006.01)
*H02K 1/26* (2006.01)

(52) U.S. Cl.
CPC ........... *H02K 17/165* (2013.01); *H02K 1/265* (2013.01)

(58) Field of Classification Search
CPC ....... H02K 1/265; H02K 17/16; H02K 17/165
USPC .............. 310/211, 216.069, 216.07–216.073
See application file for complete search history.

(56) References Cited

U.S. PATENT DOCUMENTS

| 6,246,141 B1 * | 6/2001 | Bailey .................. | H02K 17/205 310/211 |
| 2010/0253174 A1 * | 10/2010 | Yabe .................... | H02K 17/205 310/212 |
| 2014/0252910 A1 * | 9/2014 | Kunihiro .............. | H02K 17/165 310/211 |

FOREIGN PATENT DOCUMENTS

| DE | 2756685 A1 * | 7/1978 | .......... H02K 17/165 |
| JP | 2011087373 A * | 4/2011 | |
| KR | 10-2009-0007050 A | 1/2009 | |
| KR | 10-2010-0087865 A | 8/2010 | |

OTHER PUBLICATIONS

Andreassen, Machine Translation of DE2756685, Jul. 1978.*
Kon Do, Machine Translation of JP2011087373, Apr. 2011.*

* cited by examiner

*Primary Examiner* — Quyen Leung
*Assistant Examiner* — Eric Johnson
(74) *Attorney, Agent, or Firm* — Knobbe Martens Olson & Bear LLP (57) ABSTRACT

A rotor with a two-step shaped slot may include a rotor core configured to include a plurality of shoe structures which have a two-step shaped slot, a plurality of rotor bars configured to be inserted into and coupled to the two-step shaped slot, and end rings configured to be coupled to both ends of the rotor core and to fix the rotor bars.

6 Claims, 8 Drawing Sheets

ROTOR WITH 2-STEP SHAPED SLOT AND INDUCTION MOTOR HAVING THE SAME

CROSS-REFERENCE TO RELATED APPLICATION

This application claims the benefit of priority to Korean Patent Application No. 10-2013-0122692 filed on Oct. 15, 2013, the entire contents of which are incorporated herein by reference.

TECHNICAL FIELD

The present inventive concept relates to a rotor for an induction motor; and particularly, to a rotor structure for increasing the efficiency thereof to improve the electric characteristics thereof by reducing leakage from an induction motor to which a copper bar is applied.

In addition, exemplary embodiments of the present inventive concept relate to a rotor structure having improved mechanical characteristics by increasing the stability of a rotor on a high-speed rotation, and an induction motor having the rotor.

BACKGROUND

The term "motor" is represented as both the term "electric equipment" and the term "electric machine". That is to say, a motor has both the electrical characteristic and the mechanical characteristic. On the design of an induction motor, as the ribs of a rotor is thinner, leakage is smaller, so that the electrical characteristic becomes superior.

However, when the ribs are thin, a bar breaks away on a high-speed rotation to deteriorate the mechanical characteristic. In contrast, as the ribs are thicker, the mechanical characteristic (i.e. the stability of the rotor) is improved, but leakage increases to deteriorate the electrical characteristic. Therefore, it is necessary to design ribs in which both the electrical characteristic and the mechanical characteristic are taken into consideration.

In general, the rotor of an induction motor includes stacked electric steel sheets, a rotor bar, and an end ring. Such a rotor is configured in such a manner as to first manufacture a rotor core having a plurality of slots formed therethrough by stacking a plurality of punched electric sheets, to form a rotor bar by filling each slot of the rotor core manufactured as above with molten aluminum in a die-casting operation work, and to form an end ring connected between both ends of the rotor bar.

When such a rotor bar is manufactured in a die-casting scheme using aluminum, the efficiency thereof is slightly lower than that in the case of using a copper (Cu) bar. Generally, centrifugal force is proportional to weight. However, on comparison with a copper bar, since aluminum, which is the lightest metal, has a 3.3 times lower density, the centrifugal force is small although the rib is configured to be thin, so that the mechanical characteristic is excellent.

SUMMARY

An aspect of the present inventive concept is directed to a rotor with a two-step shaped slot which has an improved electrical characteristic by reducing leakage of the rotor and increasing the efficiency thereof, and an induction motor having the rotor.

Another embodiment of the present inventive concept is directed to a rotor with a two-step shaped slot which has an improved mechanical characteristic by increasing the stability of the rotor on a high-speed rotation, and an induction motor having the rotor.

Other aspects and advantages of the present inventive concept can be understood by the following description, and become apparent with reference to the embodiments of the present inventive concept. Also, it is obvious to those skilled in the art to which the present inventive concept pertains that the aspects and advantages of the present inventive concept can be realized by the means as claimed and combinations thereof.

One aspect of the invention provides a rotor comprising: a rotor core comprising a plurality of slots, each slot comprising a stepped opening; a plurality of rotor bars, each inserted in one of the slots; and end rings, each coupled to one of both ends of the rotor core and fixed to the rotor bars.

In the foregoing rotor, the stepped opening of each slot may comprise: a first portion has a first gap; and a second portion has a second gap greater than the first portion. The first portion is located exterior to the second portion. The first gap has a width of about 0.8 mm, and the second gap has a width of about 1.5 mm. The first gap is configured to reduce spatial higher harmonics according to the width of the first gap, and the second gap is configured to prevent leakage according to the width of the second gap. The rotor may further comprise two immediately neighboring teeth to form one of the slots therebetween, wherein the two immediately neighboring teeth respectively comprise stepped ribs protruding toward each other such that the stepped opening is formed by the stepped ribs, wherein each of the stepped ribs respectively comprise a first rib portion and a second rib portion, wherein the first rib portion have a width smaller than that of the second rib portion. The width of the first rib portion is about 0.5 mm, and the width of the second rib portion is about 1.3 mm. The rotor bars are made of copper (Cu). The rotor comprises shoe structures and the end rings which are made of copper (Cu) or aluminum (Al).

Another aspect provides an induction motor, comprising: the foregoing rotor; and a stator configured to be inserted onto an outside of the rotor.

A further aspect of the invention provides a rotor comprising: a rotor core comprising a plurality of teeth and a plurality of slots, each of which is formed between two immediately neighboring teeth among the plurality of teeth when viewed in a direction along a rotational axis; a plurality of rotor bars, each inserted in one of the plurality of slots; and end rings, each coupled to the rotor bars and disposed at or next to one of both ends of the rotor core, wherein the two immediately neighboring teeth respectively comprise stepped protrusions disposed at their distal ends and extending toward each other such that a stepped opening of the slot is formed between the two immediately neighboring teeth, wherein the stepped opening comprises first and second portions which have different gap widths.

In the foregoing rotor, the gap width of the first portion is smaller than that of the second portion located interior to the first portion. An induction motor may comprise the foregoing rotor, and a stator configured to electromagnectically cooperate with the rotor to rotate the rotor.

DETAILED DESCRIPTION

As the present inventive concept may make various changes and have various forms, it is intended to illustrate specific embodiments in the drawings and describe them in detail. However, it should be understood that this is intended not to limit the present inventive concept to specific disclosed forms but to include all changes, equivalents and replacements that fall within the spirit and technical scope of the present invention. Like reference signs are used for like components in describing each drawing.

Although the terms like a first and a second are used to describe various components, the components should not be limited by the terms. The terms may be used for the purpose of distinguishing one component from another.

For example, a first component may be named a second component and similarly, a second component may be named a first component without departing from the scope of right of the present invention. The term and/or includes a combination of a plurality of related described items or any of the plurality of related described items.

Unless being otherwise defined, all terms used herein that include technical or scientific terms have the same meaning as those generally understood by those skilled in the art.

The terms, such as those defined in dictionaries generally used should be construed to have meaning matching that having in context of the related art and are not construed as ideal or excessively perfunctory meaning unless being clearly defined in this application.

Figure 1:
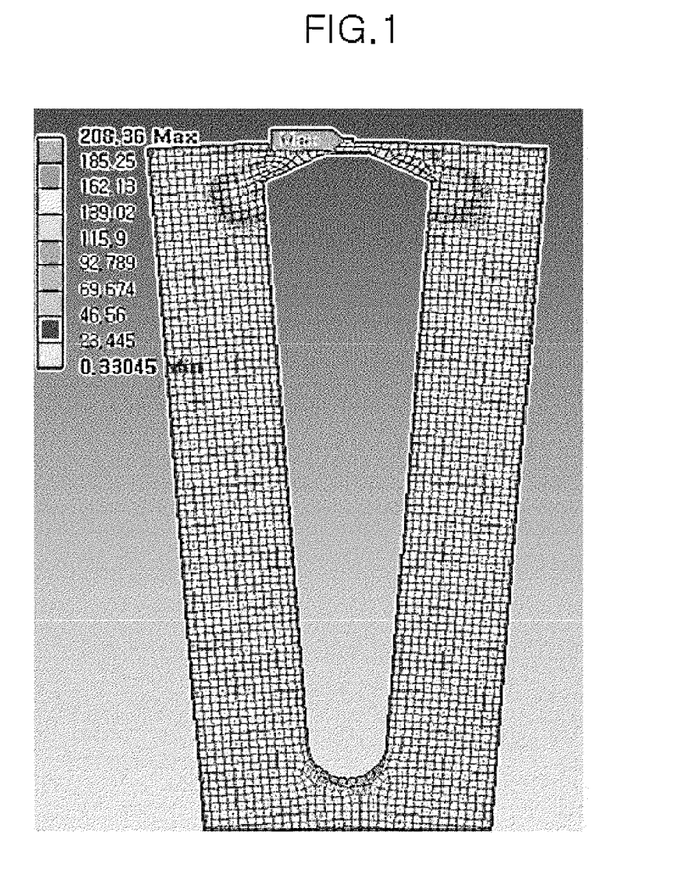
FIG. 1 is a view showing the shape of a rotor shoe when a rotor bar and an end ring (not shown) are made of aluminum material.

FIG. 1 is a view showing the shape of a rotor shoe when a rotor bar and an end ring (not shown) are made of aluminum material. Referring to FIG. 1, the thickness of a rib is approximately 0.3 mm, and the stability thereof is approximately 1.9. Therefore, since the density of aluminum is low, the centrifugal force is small, so that a mechanical problem (i.e. a problem in strength) does not occur on a high-speed rotation, but leakage increases to deteriorate the electrical characteristic.

Figure 2:
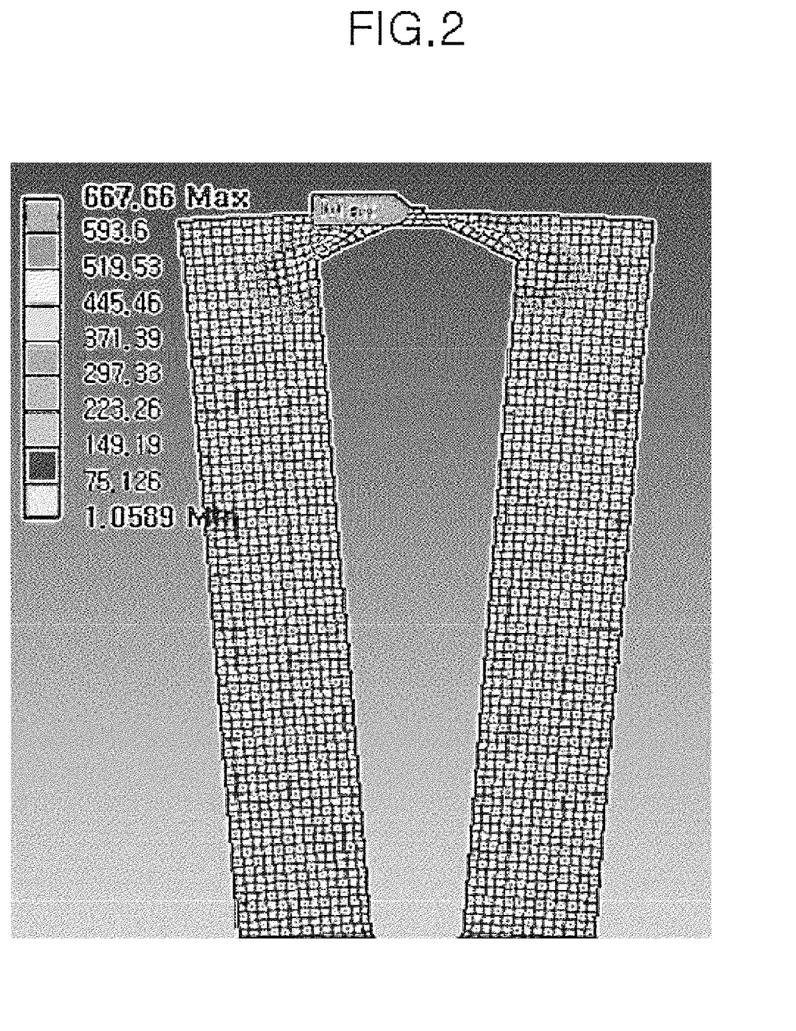
FIG. 2 is a view showing the shape of a rotor shoe when a rotor bar and an end ring (not shown) having the same shapes as those shown in FIG. 1 are made of copper.

FIG. 2 is a view showing the shape of a rotor shoe when a rotor bar and an end ring (not shown) having the same shapes as those shown in FIG. 1 are made of copper. Referring to FIG. 2, the thickness of a rib is approximately 0.3 mm, and the stability thereof is approximately 0.6. Therefore, since leakage is small, and a secondary resistance is small, a secondary copper loss is reduced, so that the efficiency of the electrical characteristic is improved. However, in this case, since copper has a density 3.3 times higher than aluminum, 3.3 times greater centrifugal force ($F=mr\omega^2$) occurs to deteriorate the strength characteristic, so that the rotor may break away. That is to say, it is possible that the mechanical characteristic is not improved.

Figure 3:
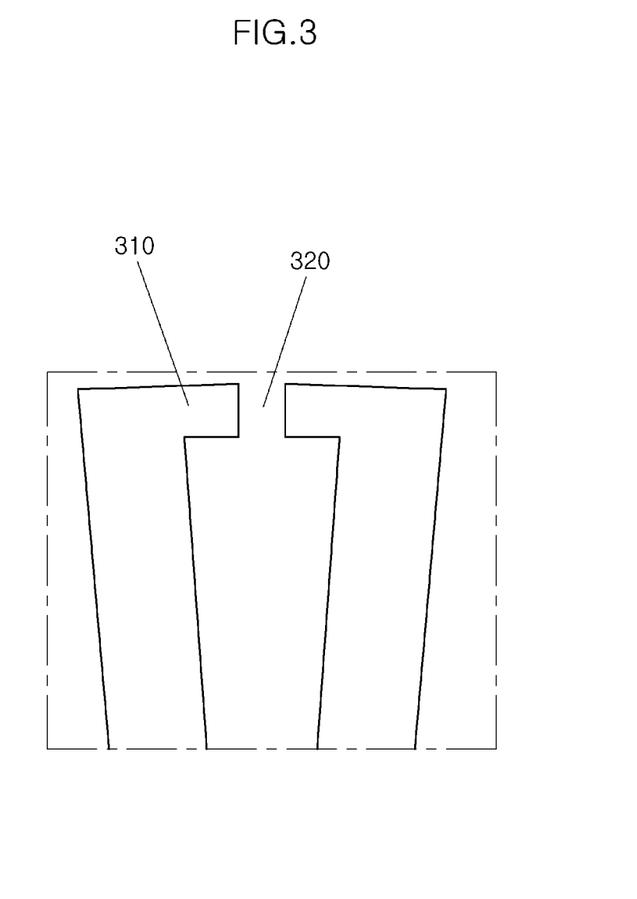
FIG. 3 is a view illustrating the width of the opening of a slot according to FIGS. 1 and 2.

In addition, FIG. 3 is a view illustrating the width of the opening of a slot according to FIGS. 1 and 2. Referring to FIG. 3, as the width of the opening 320 of the slot is wider, a magnetic resistance is less, so that leakage flux decreases to improve the efficiency. However, in this case, spatial higher harmonics increase, which causes a bad influence of increasing noise and vibration. Accordingly, it is possible that the slot cannot be configured to have an opening having a wide width.

In addition, as a shoe 310 is thinner, leakage decreases, which is advantageous in terms of efficiency. However, since the shoe is a part for supporting the centrifugal force of the copper bar which is to break away in a radial direction, the shoe cannot be configured to be thin.

Recently, the efficiency of an induction motor has been valued. An electric vehicle is required to increase the traveling distance per charging, and, to this end, it is necessary to increase the efficiency of a motor. Therefore, in order to increase the efficiency of a motor, copper (Cu) having a high conductivity and a low resistance has been used, instead of aluminum.

Accordingly, when a copper bar is applied in an induction motor, the rib is be configured to be thick, so that there is a limit in improving the efficiency, even with a superior material to aluminum.

Hereinafter, a rotor with a 2-step shaped slot and an induction motor having the same according to an embodiment of the present inventive concept will be described in detail below with reference to the accompanying drawings.

Figure 4:
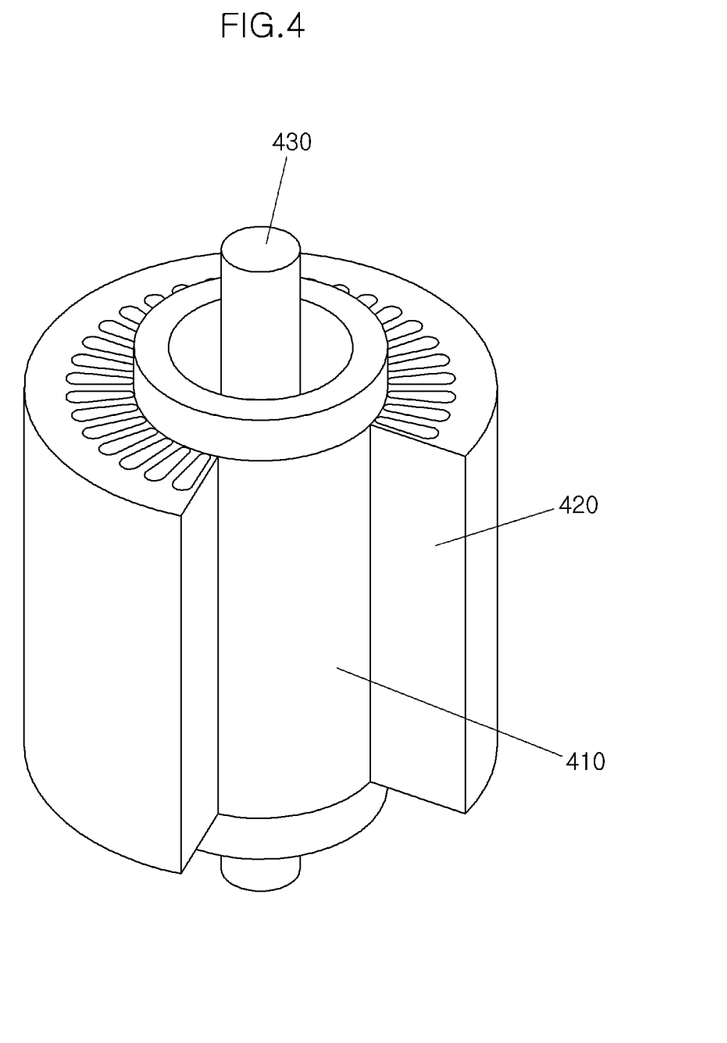
FIG. 4 is a perspective view illustrating the structure of a general motor.

FIG. 4 is a perspective view illustrating the structure of a general motor. Referring to FIG. 4, a motor 400 is configured to include a shaft 430, a rotor 410 inserted onto the outside of the shaft 430, and a stator 420 inserted onto the outside of the rotor 410.

The rotor 410 generates a torque by interaction with a rotating magnetic field. That is to say, the rotor generates a rotational force with the shaft 430 connected through a bearing (not shown). It goes without saying that, to this end, a three-phase rotating magnetic field is generated by flowing three-phase current through three-phase windings.

Such a rotating magnetic field is generated by the stator 420. As the copper bar (not shown) of the rotor interrupts flux, i.e. varies the flux of the rotating magnetic field, a voltage is induced, and an end ring (not shown) forms a closed circuit with a rotor bar, so that current flows. By the current and the rotating magnetic field, the rotor 410 is forced and rotated.

Accordingly, electrical energy is transformed into kinetic energy, wherein the transformed energy is classified into an electrical characteristic and a mechanical characteristic. The electrical characteristic includes efficiency, current, a voltage, and the like, while the mechanical characteristic includes strength, stress, noise/vibration, and the like.

The mechanical characteristic and the electrical characteristic have a trade-off relation to each other.

Figure 5A:
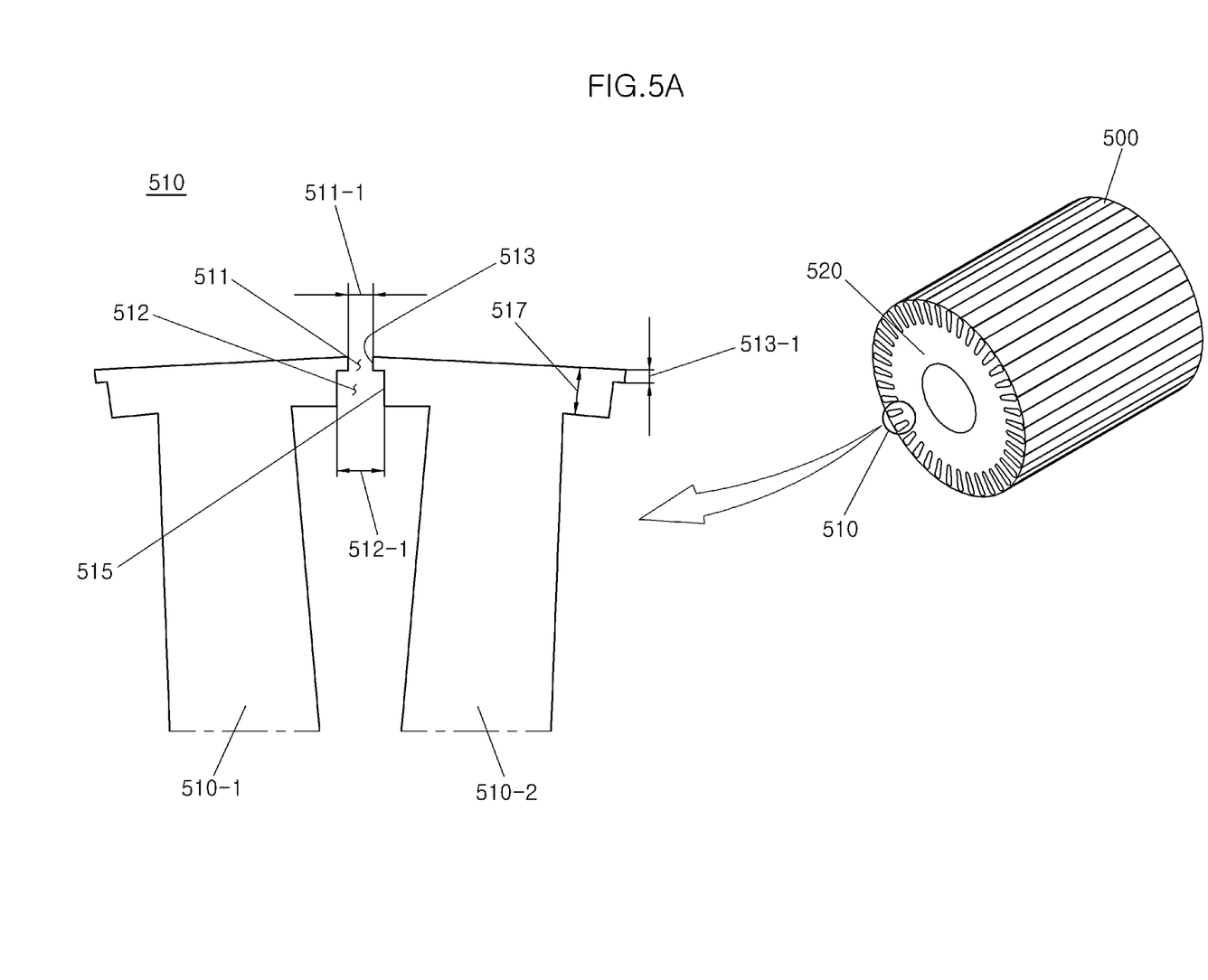
FIG. 5A and FIG. 5B are a perspective view of a rotor core to which a two-step slot is applied in accordance with an embodiment of the present invention and a partial cross sectional view illustrating the shape of a shoe of the rotor core.
Figure 5B:
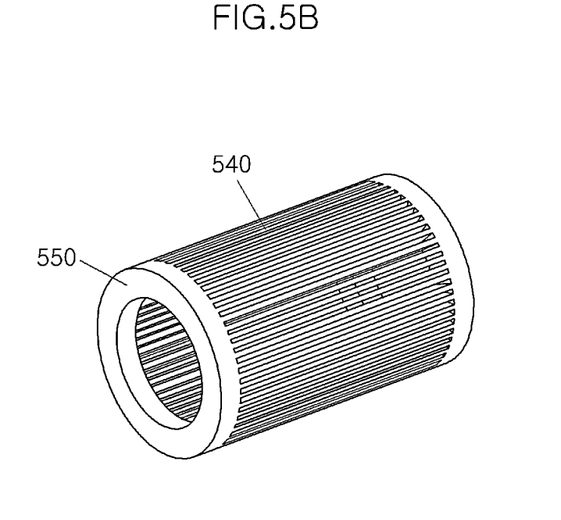

FIG. 5A and FIG. 5B are a perspective view of a rotor core to which a two-step slot is applied in accordance with an embodiment of the present invention and a partial cross sectional view illustrating the shape of a shoe of the rotor core. Referring to FIG. 5A and FIG. 5B, a rotor core 500 configured with a plurality of shoes which have a two-step shaped slot and are stacked, a plurality of rotor bars 540 inserted into and coupled to the two-step shaped slots, and end rings 550 configured to be coupled to both ends of the rotor core 500 and to fix the rotor bars 540 are included.

A shoe structure 510 includes a pair of sub-shoes or teeth, i.e. a first sub-shoe or tooth 510-1 and a second sub-shoe or tooth 510-2, and is configured in the shape of a thin disk. Such disks are stacked one by one, thereby forming the rotor core 500.

Here, the two-step shaped slot includes a first slot opening portion 511 formed by a pair of first rib portions 513 which form the upper end portion of the shoe 510; and a second slot opening portion 512 formed by a pair of second rib portions 515 which form the lower end portions of the first rib portions 513. The rotor bar 540 is inserted into the first slot opening portion 511.

Such a two-step shaped slot is excellent in both the electrical characteristic and the mechanical characteristic.

That is to say, in view of the electrical characteristic, the first rib portions 513 are configured to be thin to reduce leakage, so that the secondary resistance is reduced. Accordingly, a copper loss is reduced, and thus the efficiency is improved.

In view of the mechanical characteristic, the second rib portions 515 are configured to be thick to increase the stability of the rotor 410 on a high-speed rotation, so that the stable rotation rate of the rotor can be ensured.

For example, the first rib portions may be configured to have a width of 0.5 mm while the second rib portions are configured to have a width of 1.3 mm.

The first slot opening portion 511 is configured to have a first gap 511-1 having a predetermined width, while the second slot opening portion 512 is configured to have a second gap 512-1 having a predetermined width. The first gap 511-1 of the first slot opening portion is formed to reduce noise/vibration by reducing spatial higher harmonics, and the second gap 512-1 of the second slot opening portion is formed to prevent leakage and to improve the efficiency.

The first gap 511-1 of the first slot opening portion is configured to be narrower than the second gap 512-1 of the second slot opening portion. For example, the opening of the first slot opening portion may be configured to have a width of 0.8 mm, and the opening of the second slot opening portion may be configured to have a width of 1.5 mm.

In addition, generally, in consideration of productivity and manufacturing cost, a rotor and end rings are manufactured in such a manner as to fill slots formed on a rotor core with melted aluminum in a die-casting method.

In contrast, according to an embodiment of the present invention, the rotor bars 540 may be made of copper (Cu), and the shoe 510 and/or end rings 550 may be made of copper (Cu) or aluminum (Al).

Figure 6:
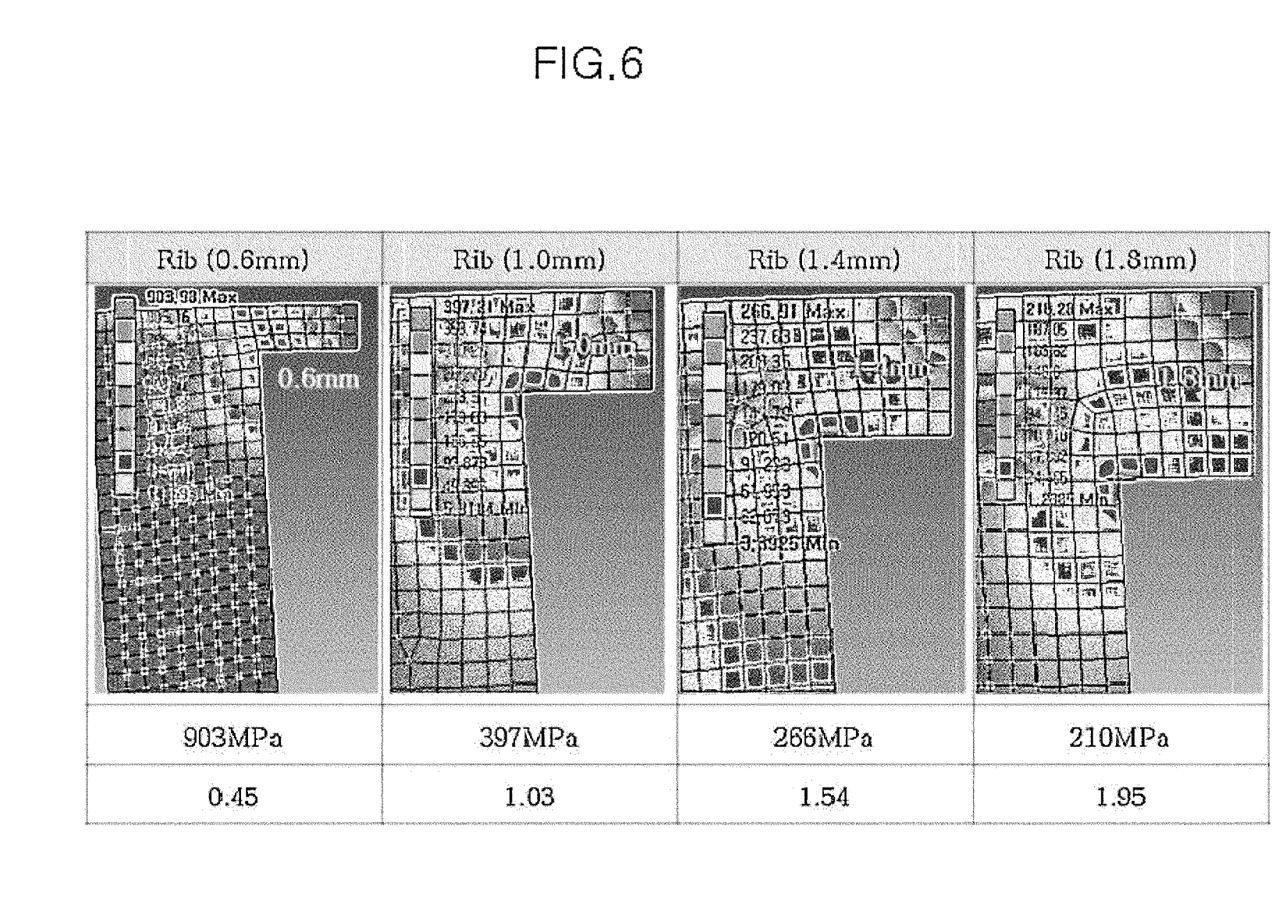
FIG. 6 is a view showing a test result according to the thicknesses of ribs with respect to a stress distribution, the maximum stress, and stability.

FIG. 6 is a view showing a test result according to the thicknesses of ribs with respect to a stress distribution, the maximum stress, and stability. Referring to FIG. 6, test result values with respect to a stress distribution, the maximum stress, and stability when ribs have the thicknesses of 0.6 mm, 1.0 mm, 1.4 mm, and 1.8 mm are shown.

Figure 7:
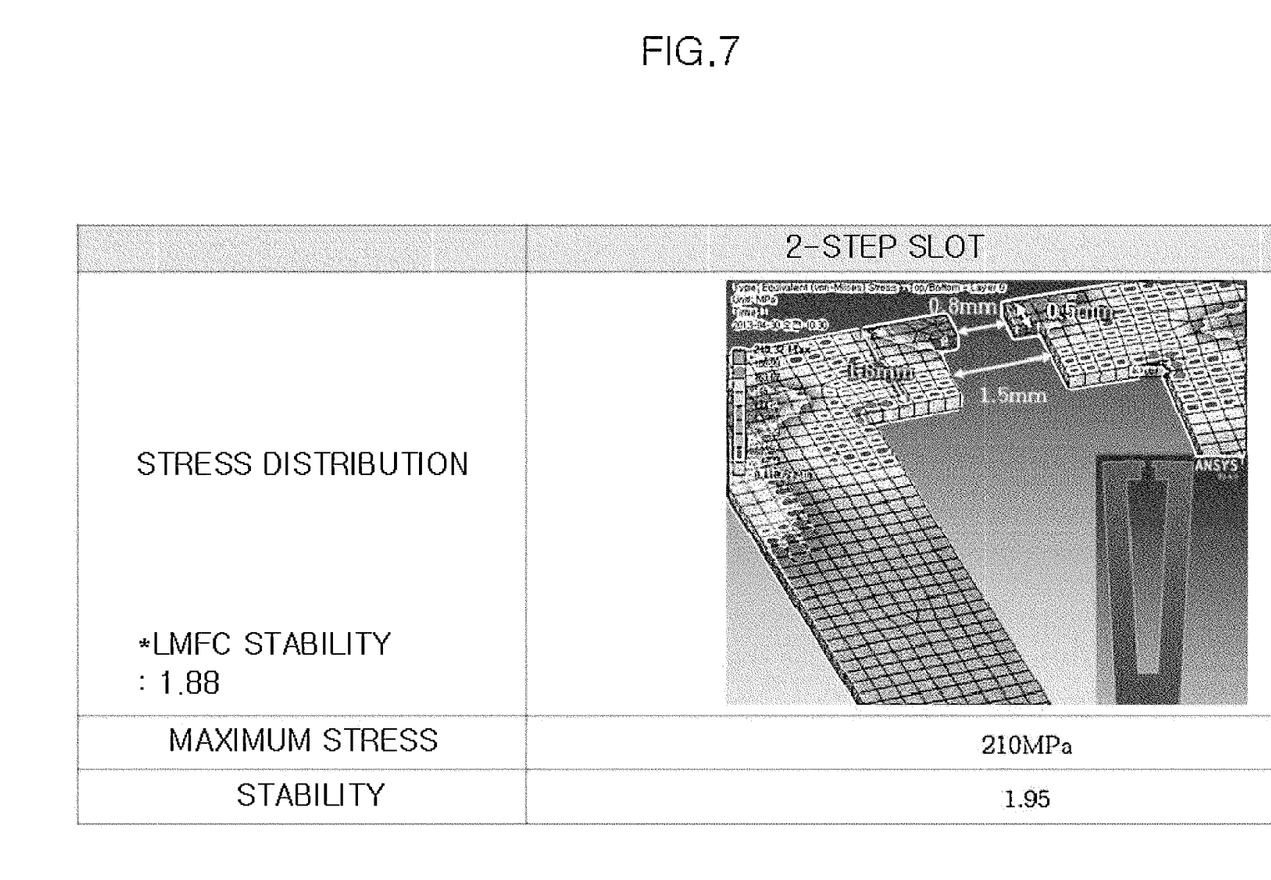
FIG. 7 is a view showing a test result with respect to a stress distribution, the maximum stress, and stability when a two-step slot according to an embodiment of the present inventive concept is applied.

FIG. 7 is a view showing a test result with respect to a stress distribution, the maximum stress, and stability when a two-step slot according to an embodiment of the present inventive concept is applied. Referring to FIG. 7, test result values with respect to a stress distribution, the maximum stress, and stability when a two-step slot according to an embodiment of the present inventive concept is applied are shown.

In accordance with the exemplary embodiments of the present invention, a structure in which both the electrical characteristic and the mechanical characteristic of a motor are taken into consideration is provided, leakage is reduced to improve the efficiency, and spatial higher harmonics are reduced to reduce noise and vibration.

In addition, in accordance with the exemplary embodiments of the present invention, since leakage is reduced, the size thereof can be reduced, which enables cost reduction.

While the present inventive concept has been described with respect to the specific embodiments, it will be apparent to those skilled in the art that various changes and modifications may be made without departing from the spirit and scope of the invention as defined in the following claims.

What is claimed is:

1. A rotor comprising:
   a rotor core comprising a central portion, a plurality of sub-shoes radially extending from the central portion, and a plurality of slots defined by the plurality of sub-shoes such that each slot is defined between two immediately neighboring sub-shoes, each slot extending along a rotational axis of the rotor, the rotor core comprising two ends in the rotational axis;
   a plurality of rotor bars, each inserted in one of the plurality of slots and extending along the rotational axis; and
   a pair of end rings, each coupled to one of the two ends of the rotor core,
   wherein the plurality of sub-shoes comprises a first sub-shoe and a second sub-shoe that are immediately neighboring with each other, wherein the first sub-shoe comprising a first protrusion protruding toward the second sub-shoe at an outermost portion of the first sub-shoe in a first radial direction passing through the first sub-shoe, the first protrusion comprising a first outer step stepping from the first protrusion's outermost edge in the first radial direction, the first protrusion further comprising a first inner step stepping from the first outer step, wherein the first protrusion extends in the first radial direction about 1.3 mm, wherein the first outer step extends in the first radial direction about 0.5 mm,
   wherein the second sub-shoe comprising a second protrusion protruding toward the first protrusion at an outermost portion of the second sub-shoe in a second radial direction passing through the second sub-shoe, the second protrusion comprising a second outer step stepping from the second protrusion's outermost edge and a second inner step stepping from the second outer step, wherein the second protrusion extends in the second radial direction about 1.3 mm, wherein the second outer step extends in the second radial direction about 0.5 mm,
   wherein the rotor core comprises a first gap between the first outer step and the second outer step, the first gap is about 0.8 mm along a circumferential direction perpendicular to the first and second radial directions,
   wherein the rotor core comprises a second gap between the first inner step and the second inner step, the second gap in the circumferential direction is greater than the first gap.

2. The rotor of claim 1, wherein the second gap has a width of about 1.5 mm.

3. The rotor of claim 1, wherein the first gap is configured to reduce spatial higher harmonics according to the width of the first gap, and the second gap is configured to prevent leakage according to the width of the second gap.

4. The rotor of claim 1, wherein the rotor bars are made of copper (Cu).

5. The rotor of claim 1, wherein the rotor comprises shoe structures and the end rings which are made of copper (Cu) or aluminum (Al).

6. An induction motor, comprising:
   the rotor configured to accord to claim 1; and
   a stator configured to be inserted onto an outside of the rotor.

* * * * *